June 30, 1953 W. L. CORTEGGIANO ET AL 2,644,074
HORIZONTAL INDUCTION HEATING SCANNER MACHINE
Filed July 15, 1949 5 Sheets-Sheet 4
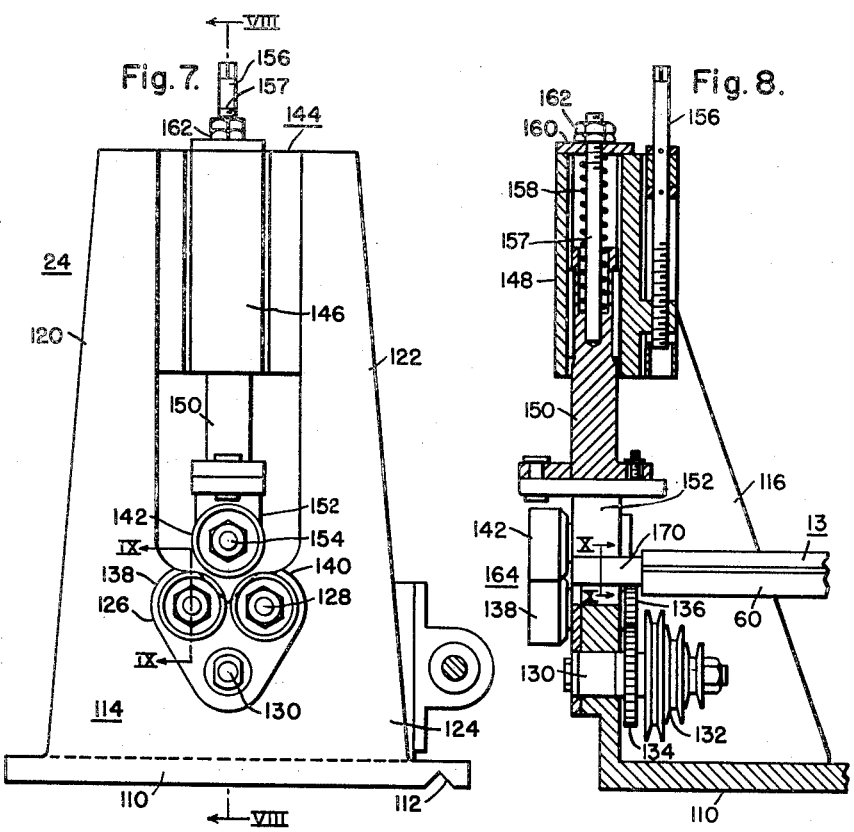
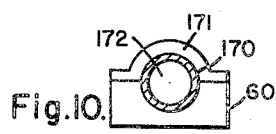
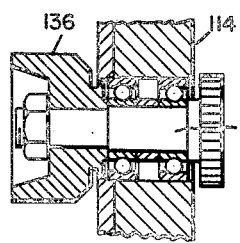
WITNESSES:
Edward Michaels
W. L. Groome
INVENTORS
William L. Corteggiano
and Theodore P. Kinn.
BY
B. L. Zanguil
ATTORNEY June 30, 1953 W. L. CORTEGGIANO ET AL 2,644,074
HORIZONTAL INDUCTION HEATING SCANNER MACHINE
Filed July 15, 1949 5 Sheets-Sheet 5
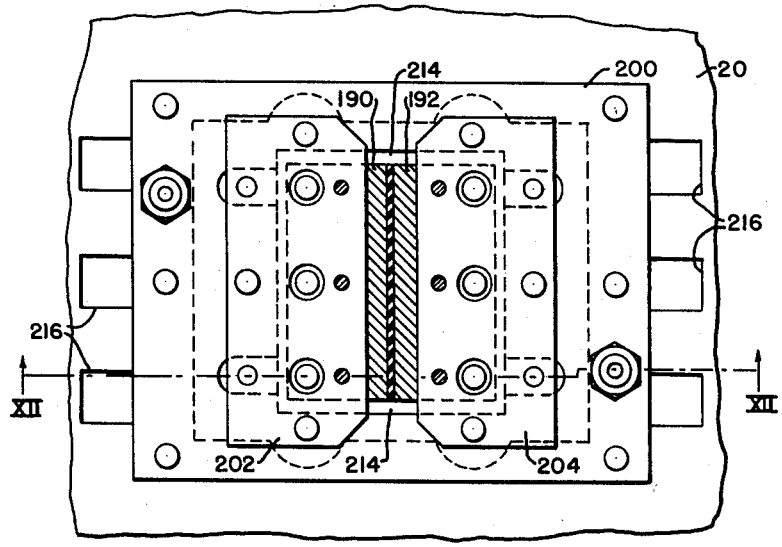
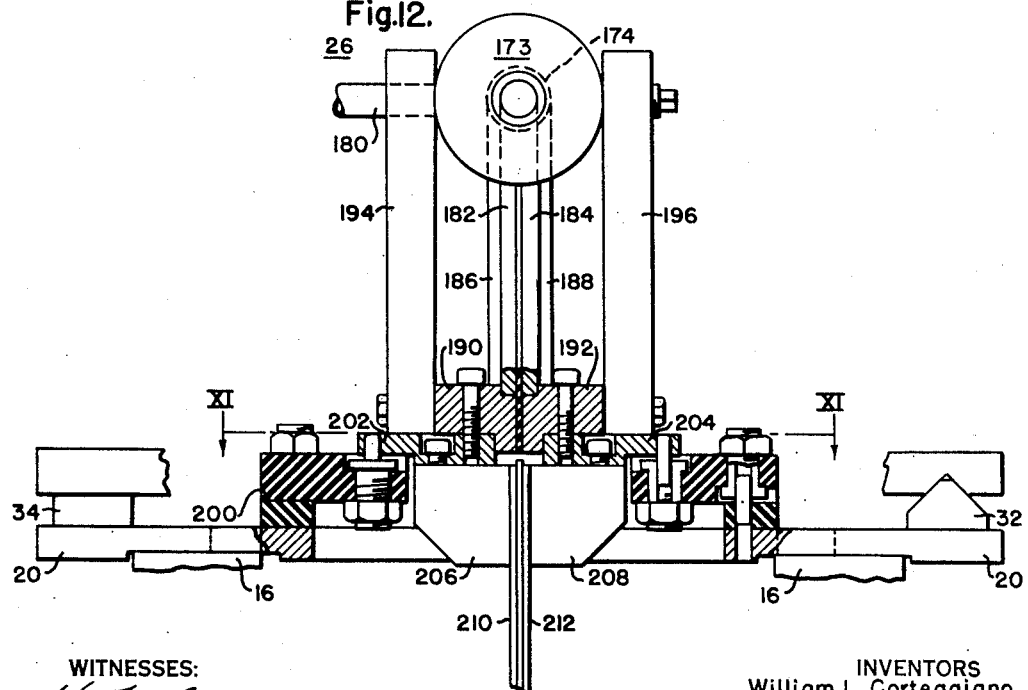
WITNESSES:
INVENTORS
William L. Corteggiano
and Theodore P. Kinn.
BY
ATTORNEY Patented June 30, 1953

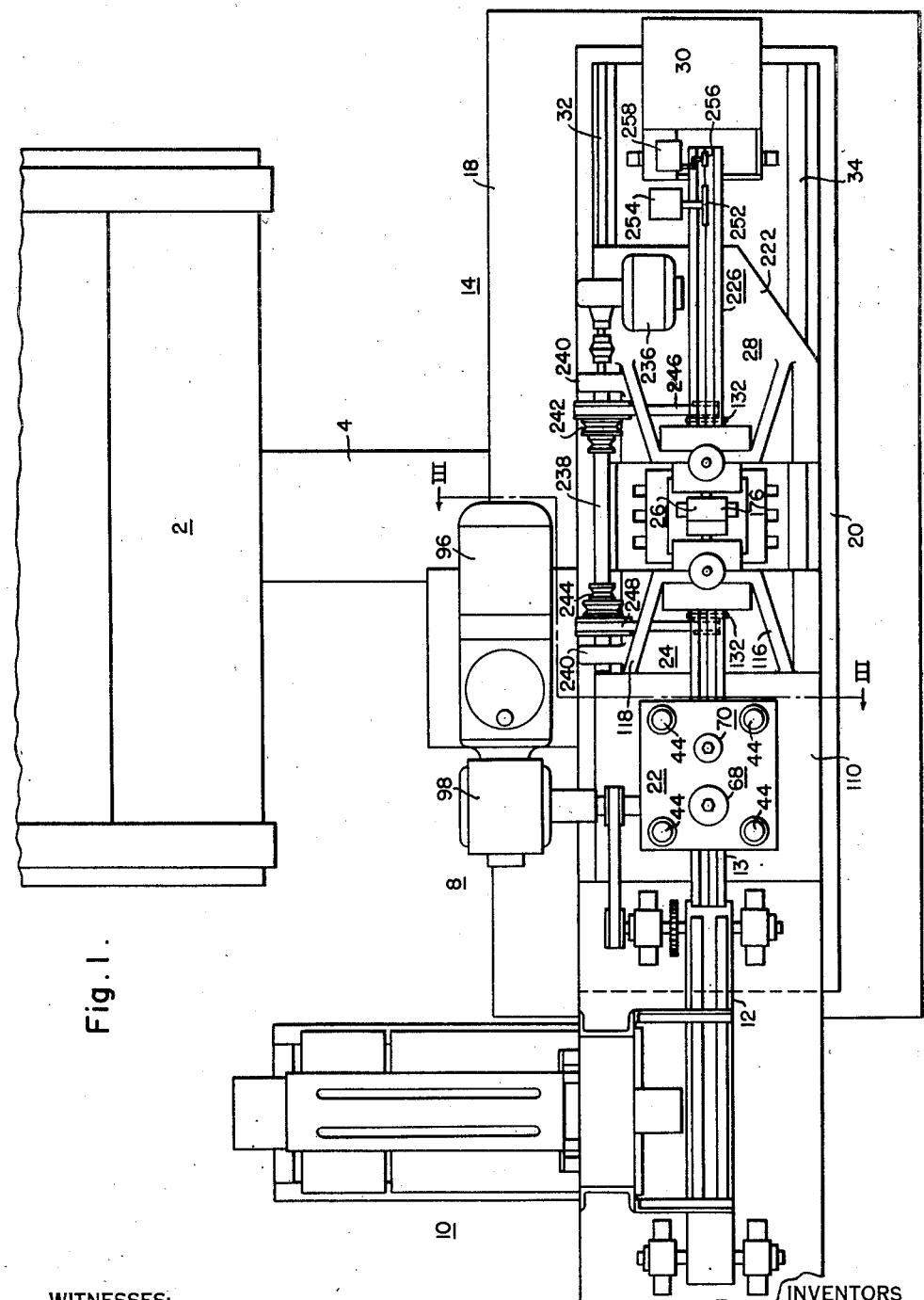

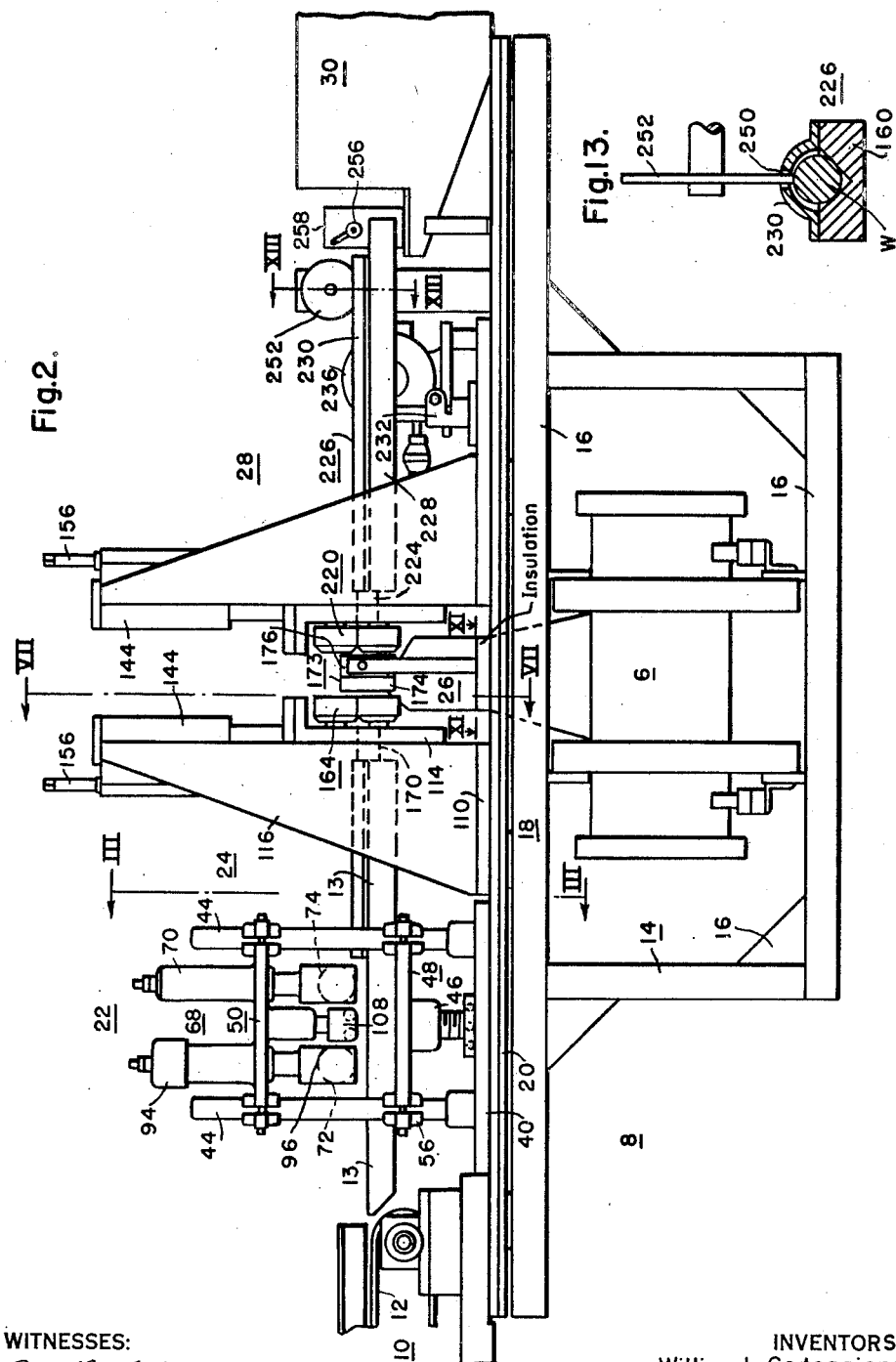

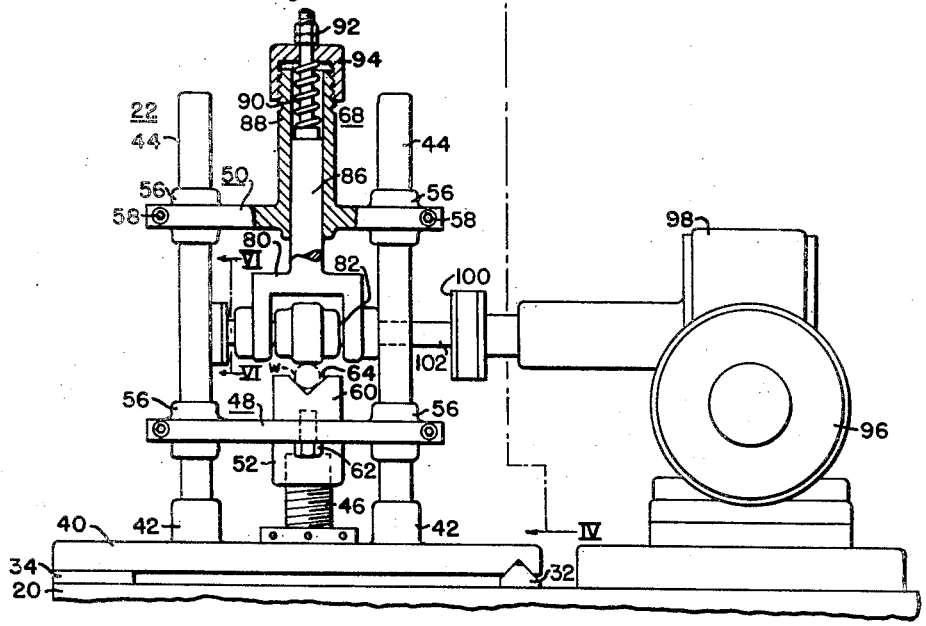
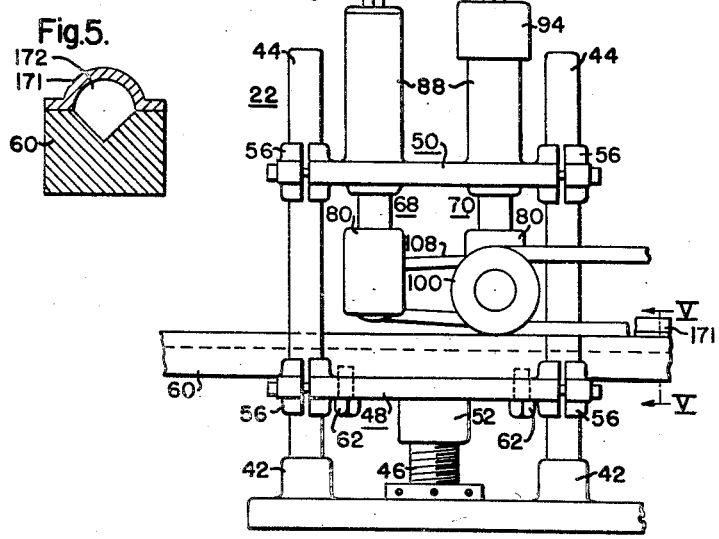
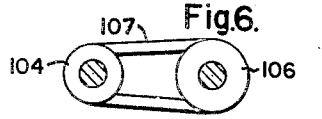

2,644,074

UNITED STATES PATENT OFFICE 2,644,074

HORIZONTAL INDUCTION HEATING SCANNER MACHINE

William L. Corteggiano and Theodore P. Kinn, Baltimore, Md., assignors to Westinghouse Electric Corporation, East Pittsburgh, Pa., a corporation of Pennsylvania Application July 15, 1949, Serial No. 104,942

6 Claims. (Cl. 219—47)

Broadly, this invention is directed to equipment for an induction heating machine which is adapted to heat-treat short round bars, rods and similar workpieces successively passed end to end through the machine. A complete machine of this type is described and claimed in the concurrently-filed application of W. L. Corteggiano, M. P. Vore and J. M. Edwards, Serial No. 104,944. Such a machine is adapted to be differently set up for treating different batches of workpieces, the workpieces of a batch being interchangeably alike but different in shape or size or both from those of another batch. The present application is directed to a scanner machine portion of such a machine, but this scanner machine portion can be otherwise used for induction heating purposes.

An object of our invention is to provide a rugged and foolproof induction heating scanner machine in which a plurality of workpieces can be successively heat-treated in a continuous process that minimizes handling of the workpieces so that the machine can be operated by unskilled labor and with a minimum of attention.

The specific scanner machine portion described in the instant application comprises essentially a mechanical mechanism adapted to receive a plurality of workpieces and force them, one at a time, through an induction heating and quenching heat-treater means properly arranged in the scanner machine. Briefly, the induction heating scanner machine comprises a main elongated bedplate horizontally supported by an underneath structure of any suitable kind, the bedplate being substantial and substantially supported. The bedplate carries, successively in the line of travel of the workpieces, a feeder item, a headstock, a heat-treater unit, and a tailstock. There is a work-carrying feed-in guide for workpieces fed to the heat-treater, and a work-receiving feed-out guide for heat-treated workpieces. The heat-treated workpieces leaving the feed-out guide may be delivered to any suitable hopper or other work-receiving device. The parts are so constructed and arranged as to minimize the possibility of the workpieces jamming as they move axially, or in the direction of their lengths, through the scanner machine.

An important feature of our invention is to provide a scanner machine of the type described having the aforesaid parts arranged as separate items on the common elongated bedplate so that they can be easily adjusted and aligned so that different batches of workpieces can be made to pass concentrically through the induction heating and quenching means, but out of contact therewith, while moving in a horizontal travel path.

A broad object of our invention is to provide an induction heating scanner machine in which the workpieces are successively fed through the machine for heat-treatment as they travel along a path which is generally horizontal as distinguished from sloped travel of the prior art. The machine comprises a feeder which forces the workpieces end to end through the machine. Preferably, the feeder is adjustable and is motor driven at a controllable speed so that the workpieces can be moved through the machine at a desired rate.

Another object of our invention is to provide an induction heating scanner machine of the type described comprising a feeder for feeding and progressing a succession of workpieces through an induction heating and quenching heat-treater means of the machine; the machine further comprising a separate means, comprising a work-feeding headstock and a work-receiving tailstock, for rotating the workpieces as they pass through the induction heating and quenching means; the feeder and the rotating means being separately controllable for separately controlling the rates at which the workpieces move axially and at which they rotate about their axes.

A feature of our invention is to provide a scanner machine of the type described so constructed as to accessibly support its induction heating and quenching unit so that the latter can be easily interchanged with other similar units. To this end, the machine carries a pair of terminal structures to which a source of high frequency can be terminally connected. The terminal structures are adapted to removably receive the induction heating and quenching unit and are adapted to be electrically connected to the induction heating coil thereof.

Our invention has numerous features, innovations and objects in addition to the foregoing which should be discernible from the following description of a preferred embodiment thereof. The description is to be taken in conjunction with the accompanying drawings, in some figures of which some details have been omitted for clarity. In the drawings:

Figure 1 is a plan view of an induction heating machine in which our induction heating scanner machine has been incorporated;

Fig. 2 is an elevational view of an induction heating scanner machine in accordance with our invention and comprises a portion of the machine shown in Fig. 1;

Fig. 3 is a vertical view substantially on the line III—III of Figs. 1 and 2 for illustrating the feeder item of our invention, with a part in section;

Fig. 4 is a vertical sectional view substantially on the line IV—IV of Fig. 3;

Fig. 5 is a vertical sectional view substantially on the line V—V of Fig. 4;

Fig. 6 is a vertical sectional view substantially on the line VI—VI of Fig. 3;

Fig. 7 is a vertical sectional view of a headstock of our invention taken substantially on the line VII—VII of Fig. 2;

Fig. 8 is a vertical central sectional view taken substantially on the line VIII—VIII of Fig. 7;

Figs. 9 and 10 are vertical sectional views taken, respectively, substantially on the lines IX—IX and X—X of Figs. 7 and 8;

Fig. 11 is a sectional view substantially on the line XI—XI of Figs. 2 and 12, showing a part of the terminal structure carried by the machine;

Fig. 12 is a vertical view partly in elevation and partly in section substantially on the line XII—XII of Fig. 11 for showing the induction heating and quenching unit of the machine supported by the terminal structure; and Fig. 13 is a vertical sectional view substantially on the line XIII—XIII of Fig. 2.

Referring to the drawings, an induction heating machine in accordance with the aforesaid patent application, Serial No. 104,944 comprises a high-frequency generator 2 that has energizing conductors passing through a protective casing 4 to a current transformer 6 that may be a part of the scanner machine 8, shown in elevation in Fig. 2. Workpieces to be case hardened or otherwise heat-treated can be fed to the scanner machine from a loader portion 10 described in greater detail in the aforesaid application. The loader portion 10 comprises a belt-conveyor 12 which continually feeds workpieces in single file to a feed-in guide 13 of the scanner machine 8.

The scanner machine 8 comprises an understructure in the form of a table indicated in its entirety by the reference numeral 14. The table comprises a plurality of deep-section, longitudinal and lateral steel structural members 16 forming an open framework with an open top 18 on which a bedplate 20 is solidly secured. Preferably, the table is made of truss construction to eliminate the possibility of sway or other displacement.

A feeder item indicated in its entirety by the reference numeral 22 is arranged at the feed end of the work-receiving feed-in guide 13. Power-driven feeder rollers in the feeder 22 supply a positive drive to propel the train of workpieces to a headstock indicated in its entirety by the reference numeral 24. The headstock 24 guides the workpieces to an induction heating and quenching heat-treater unit indicated in its entirety by the reference numeral 26; the headstock 24 being provided with a roller means for imparting a rotary motion to each workpiece as it enters the induction heating and quenching means 26. As the leading end of each workpiece emerges from the heat-treating means 26, it enters a tailstock which is generally similar to the headstock 24 and is indicated in its entirety by the reference numeral 28. At the feed-in or work-entering end of the tailstock 28, roller means are provided that continue the rotation of the workpieces, and support and guide them after they leave the headstock 24 and during the time they are inside the heat-treater means 26. The heat-treated workpieces then pass to a work-receiving feed-out guide and are delivered to a chute, hopper or work-receiving means 30 where they may be collected or may be passed to further handling means if desired.

An important feature of our invention is the arrangement of the aforesaid parts so that the workpieces constantly move generally horizontally through the scanner machine end to end, with the workpiece in the heat-treater unit 26 rotating without causing jamming or buckling of the line of travelling workpieces. To this end, special attention is given to assuring adjustment and alignment of the parts of the scanner machine. The bedplate 20 is made of heavy steel plate, and its top surface is provided with a carefully machined positioning rail 32 extending lengthwise along one side of the bedplate and with a carefully machined rest rail 34 along the other side of the bedplate. In operating position of the scanner machine, the bedplate is solidly supported with its rails 32 and 34 level in lengthwise direction. The positioning rail 32 is preferably of an inverted V-shape in cross-section, while the top of the rest rail 34 is flat.

The feeder unit 22 comprises a base plate 40 having an inverted V-shaped groove along a side of its bottom that mates the positioning rail 32, and a flat surface along its other side that rests on the rest rail 34. The base plate 40 carries four machined upright sockets 42 in each of which finished vertical posts 44 are secured. The base plate 40 also has a short jackscrew arrangement 46. The posts 44 adjustably receive a lower carefully-machined guide-supporting plate 48 and an upper roller-supporting plate 50. The lower supporting plate 48 is provided with a depending socket 52 that fits the adjusting post of the jackscrew 46.

The corners of each plate 48 and 50 are split and are provided with split guides 56 by means of which they are tightly clamped, after vertical adjustment, to the posts 44 through clamping bolts and nuts 58 that pull the split portions together in the common manner when tightened and permit them to spread when loosened.

The lower plate 48 is also carefully machined and carries the feed-in guide 13. The feed-in guide comprises an elongated bar 60 that is secured to the top of the lower plate 48 through bolts 62. The upper surface of the bar 60 has a V-trough 64. In a working embodiment subsequently referred to, the trough 64 was a 120 degree angle with its sides 60 degrees from a vertical line through the apex of the trough.

The upper plate 50 of the feeder 22 carries a pair of workpiece pushing or moving means 68 and 70, the former being at the feed-in end of the feeder 22. These pushing means 68 and 70 force the workpieces through the scanner machine. The pushing means 68 and 70 comprise rubber or rubber faced rollers 72 and 74 respectively, directly over the trough 64. Each roller is supported so as to be able to exert an adjustable force and pressure on a workpiece it contacts.

To this end, each of the pushing means 68 and 70 supports its associated roller in the same general manner so that a description of one will suffice for the other. The pushing means 68 comprises a yoke 80 rotatably supporting a shaft 82 which is perpendicular to the line of travel of the workpieces and which has secured thereto the roller 72. Extending upwardly from the yoke 80 is a stem 86 slidably held in a cylinder 88 which is part of or unitary with the upper plate 50. The stem 86 is shaped to receive a compression spring 90. The upper end of the stem 86 is threaded and receives adjusting nuts 92 that bear on a cap 94 adjustably screwed on the top of the cylinder 88.

In setting up the feeder item 22 for operation, the jackscrew 46 is used to bring the lower plate 48 to a suitable level. This places the guide 13 horizontal. The upper plate 50 is then lowered until the rollers 72 and 74 press on a workpiece W thereunder with a suitable pressure. The cap screw 94 is then loosened so that the pressure it exerts on a workpiece is decreased, and the roller 74 of the pusher means 70 supplies the primary driving force for moving the train of workpieces through the scanner. Consequently, no fine adjustment, such as provided by a cap screw, is necessary for the pusher means 70. By trial and error, the feeder can be adjusted so as to linearly slide workpieces along the guide 13 at a desired speed.

The shafts 82 for the rollers 72 and 74 of the pushing means 68 and 70 are driven by a motor 96 driving an adjustable speed reducer 98 which is geared, by belting, sprocket, or similar means to a pulley or sprocket wheel 100 secured to an extension 102 of the shaft 82 of the pushing means 70. The shafts 82 of the rollers 72 and 74 have pulleys or sprocket wheels 104 and 106, respectively, on their ends opposite to the drive wheel 100. These wheels 104 and 106 are interconnected by a drive belt or sprocket 107 so that the rotation of the shaft 82 with the roller 74 causes rotation of the shaft 82 with the roller 72 in the same direction. However, the wheel 104 has a diameter slightly smaller than the wheel 106, so that the roller 72 has a higher linear speed than the roller 74.

Spaced between the rollers 72 and 74 is a set of vertically adjustable idler positioning rollers 108 (not indicated in Fig. 4) which are dependently resiliently carried in the upper plate 50.

In the operation of the apparatus thus far described, workpieces are fed substantially end to end from the conveyor 12 of the loader portion 10 to the work-receiving guide 13 from which the workpieces pass one after the other to the feeder 22. The conveyor belt 12 runs at a slightly faster rate than the progression of the train of workpieces through the scanner machine so as to keep the workpieces in end to end contact. Because the longitudinal driving force of the conveyor 12 is small, the pressure of the first pushing means 68 on the workpieces must also be light so as not to prevent the workpieces from entering the limited space below it. Consequently the roller 72 of the pushing means 68 exerts relatively little pressure on a workpiece, and imparts only a small minor part of forward motion to it. However, because of the smaller diameter of the drive wheel 104 as compared to that of the drive wheel 106, the surface of the roller 72 of the pushing means 68 has a higher linear speed than that of the roller 74 of the pushing means 70, and further assures end to end contact of the workpieces. The roller 74 of the pushing means 70 provides most of the force which propels the line of workpieces from the feeder 22 through the rest of the scanner machine. Workpieces leaving the feeder item 22 pass end to end along the guide 13 to the headstock 24.

The headstock 24 is substantially the same as the tailstock 26 so that a description of the details of one should suffice for both.

Referring to Figs. 2 and 5 through 9, the headstock 24 comprises a base plate 110, one side of the lower surface of which is provided with an inverted V-groove 112 that extends longitudinally of the bedplate 20 and fits on the positioning rail 32. The other side of the base plate is finished to rest on the rest rail 34 of the bedplate 20. The headstock also comprises a face plate 114 that extends upwardly from the work-exit edge of the base plate 110, and web or side plates 116 and 118. The web plate 118 is provided with a hole through which a power-driven belt is adapted to pass for a purpose which will later be apparent. The upper central part of the face plate 114 is cut out as indicated in Fig. 7 to provide a pair of upwardly-extending legs 120 and 122 and a lower transverse portion 124 that extends laterally across the headstock. This lower portion 124 is provided with a thickened portion adapted to receive journals for a pair of roller shafts 126 and 128 that are horizontally parallel and for a drive shaft 130 centrally below the shafts 126 and 128.

The drive shaft 130 is provided with a plurality of speed-changing pulleys 132 and a driving gear 134. The gear 134 meshes with a gear 136 on each of the shafts 126 and 128 so that these two shafts rotate in the same angular direction. The shafts 126 and 128 carry work-rotating rollers 138 and 140, respectively, for rotation therewith.

The headstock 24 also comprises a third roller 142 rotatably carried by a vertically adjustable, pressure-exerting member 144 that in turn is carried by and between the legs 120 and 122 of the headstock. To this end, the pressure-exerting member 144 comprises a slide member 146 vertically slidably adjustable between the legs 120 and 122. The slide member 146 comprises a cylinder 148 that receives a stem 150 slidable therein. The bottom of the stem 150 receives a block 152 in which a shaft 154 for the roller 142 is received.

The vertical position of the slide member 146 is determined by an adjusting screw 156 that in turn is carried by parts secured to the legs 120 and 122, the screw being carried so that it is rotatably but not axially movable. The stem 150 is shaped to provide a thin rod 157 about which a compression spring 158 is placed. The spring 158 is compressed between a shoulder in the stem and a top plate 160 for the cylinder 148. The rod 157 has an upper threaded end that receives lock nuts 162. By suitable adjustments through the nuts 162 and screw 15 the amount of pressure which the roller 142 will exert on a workpiece in the space between the triangularly-arranged rollers 138, 140 and 142 can be controlled. Preferably, these rollers are hardened steel and have their faces which contact the workpieces finished. Preferably also, the side of the upper roller 142 which first receives an oncoming workpiece, and if desired the same sides of the other rollers, is beveled or conical in order to readily receive the workpiece.

The rollers 138, 140 and 142 of the headstock provide a roller set 164 that constitutes work-rotating means that receive workpieces leaving the feed-in guide 13 and rotate them about the longitudinal axes of the workpieces. The feed-in guide 13 comprises, in addition to the elongated trough-shaped member 60, a short tube 170 at the work-exit end of the guide. The trough-shaped member 60 is shown in cross section in Fig. 5 and appears in Fig. 10, and has short removable cover parts 171 that makes the guide appear as a tunnel-like member with a groove 172. As many removable covers 171 can be provided for as much of the length-portions of the guide 13, as desired, between the various items of the scanner machine.

The exit tube 170 of the feed-in guide 13 suitably feeds workpieces into the space between the set of work-rotating rollers 138, 140 and 142 of the headstock 24. The rollers are properly located so as to satisfactorily guide workpieces into the heat-treater induction heating and quenching means 26.

The induction heating and quenching heat-treater means 26 comprises a head 173 having a central work-receiving opening and including an induction heating coil-portion 174 and a quench portion 176 fed with water through a hose 180 and discharging this liquid through holes in its inner surface, as is known to the art. The head 173 is carried on relatively insulated low-inductance conductor plates 182 and 184 to which the extended ends 186 and 188 of the induction coil are secured. The conductor plates 182 and 184 are intimately secured to terminal blocks 190 and 192. Upright insulating posts 194 and 196 extend from the terminal blocks to the sides of the head 173 to help keep the head in position. The aforesaid induction heating and quenching means is shown in greater detail and claimed in the concurrently-filed application of W. L. Corteggiano and J. M. Edwards, Serial No. 104,943, now abandoned, to which reference may be had for further details.

An important feature of our scanner machine resides in the supporting of this induction heating and quenching heat-treater means 26 therein with the axis of the head 173 horizontal. To this end, the bedplate 20 is provided with a central hole that receives a rectangular frame 200 of insulating material. A pair of opposed sides of the upper face of this horizontal frame adjustably carries a pair of spaced energizing terminals 202 and 204 to which the terminal blocks 190 and 192 of the heat-treater unit 26 are respectively secured. The bottoms of terminals 202 and 204 respectively receive relatively insulated conductor lugs 206 and 208 therebelow. The conductor lugs 206 and 208 are sufficiently broad respectively to receive relatively insulated low-inductance power-supply conductors 210 and 212 from the output of the high-current secondary of the current transformer 6.

It is to be noted that the induction heating and quenching means 26 is of slightly less width than the opening in the frame 200, thereby providing openings 214 through which spent quench liquid can drain from the bedplate. To facilitate such drainage, the bedplate may additionally be provided with a plurality of drain holes 216 wherever desired, and with a liquid catching trough around its edges that is provided with a suitable spout.

As each workpiece leaves the headstock 24, it moves through the opening in the head 173 of the induction heating and quenching heat-treater means 26, first passing by the induction coil portion 174 and then passing by the quench portion 176. As a workpiece leaves the heat-treater means 26, it is gripped by work-rotating means comprising a set 220 of rollers in the tailstock 28 of the unit. In general, this tailstock 28 is similar to the headstock 24 except that it has a larger base plate 222 and its parts are in reverse order so that a workpiece first engages a conical portion of the set 220 of rollers, and enters a tube 224 of a feed-out guide 226 after leaving the rollers.

The feed-out guide 226 is constructed in the same way as is the feed-in guide 13. It comprises the entrance tube 224 and a V-trough bar member 228 provided wherever necessary with a cover 230 to provide a tunnel-like member in which workpieces slide without jamming. The feed-out guide 226 is adjustably carried on one or more posts 232 secured to the base plate 222.

The sets 164 and 220 of work-rotating rollers of the headstock 24 and tailstock 28 are rotated at any desired speed by a variable speed electric motor 236 carried on the base plate 222. The motor 236 drives a shaft 238 journalled in suitable pillow blocks 240 on the base plates of the tailstock and headstock. The shaft 238 has gearing 242 for the tailstock, and 244 for the headstock. This gearing is belt-connected by belts 246 and 248 to the pulley sets 132 of the tailstock and headstock, respectively. The sets 164 and 220 of work-rotating rollers are suitably adjusted so that a workpiece leaving the tube 170 of the feed-in guide 13 will rest on the lower rollers of each while moving in the desired horizontal line of travel.

The tube 170 and rollers 138 and 140 support a workpiece as it is forced out of the guide 13 and into the roller-set 164 by the other workpieces in back of it which are driven forward by the feeder unit 22. While supported and rotated by the set 164 of rollers of the headstock, the workpiece passes through the heat-treatment means 26 and to the set 220 of rollers of the tailstock 28. The workpiece enters this set 220 of rollers, and is temporarily jointly supported and rotated by the sets of rollers 164 and 220. When the workpiece is pushed further through the head 173 of the heat-treating means 26, it is supported by the rollers 220 of the tailstock, and finally the workpiece enters into the tube 224 of the feed-out guide 226.

Preferably, the tube 170 of the feed-in guide 13 and the tube 224 of the feed-out guide 226 are of a diameter only slightly larger than the workpieces. For a workpiece one-half inch in diameter, a clearance of ten one-thousandths of an inch is ample to allow a workpiece to be forcibly rotated, without permitting jamming of the train by virtue of the tendency of the adjacent workpiece to rotate because of frictional engagement with the ends of the rotated workpiece.

As is apparent from Figs. 1, 2 and 13, workpieces moving along the feed-out guide 226 pass by an elongated slot 250 in the cover 230 of this guide. A circumferential portion of a tachometer wheel 252 lies in this slot with the plane of the wheel parallel to line of travel of the workpieces. This wheel 252 bears very lightly on the moving workpieces W and will revolve at a speed proportional to that at which the workpieces move linearly. The wheel consequently will drive an electrical device 254 at a corresponding speed.

The feed-out guide 226 directs heat-treated workpieces leaving the tachometer wheel 252 into the receiving bin 30. However, it is to be noted that the cover member 230 of the guide 226 terminates short of the exit end of V-trough bar 228 of the guide 226 so that an additional control member or wheel 256 will be actuated by each workpiece as it falls from or leaves the guide 226. This wheel operates on control switch 258.

Preferably, the sets of work-rotating rollers in the headstock and tailstock are arranged with their axes about which they rotate parallel to the line of travel of the workpieces so that they impart only a rotary motion to the workpieces. However, the upper pressure-exerting roller of each set of rollers can be skewed slightly if desired to impart some forward motion to the workpieces. Whatever setup is used on the headstock should be duplicated in the tailstock whose rollers take hold of the workpiece before it leaves the headstock. In this way, the workpiece is always centered in the head 173 of the heat-treatment means 26, and considerably greater tolerance is permissible in the adjustment of the remaining parts of the equipment.

The distance between the roller sets 164 and 220 of the headstock and tailstock must be less than the lengths of the workpieces, and sufficiently less so that each workpiece can be properly supported as it passes from set 164 into set 220.

As an example of the positioning of the parts for heating cylindrical shifter rails having a length from about 4½ to 7 inches, the distance between the face of the head 173 and the sets 164 and 220 of work-rotating rollers was $\frac{9}{16}$ inch, with a head having an axial overall length of two and one-half inches.

For obtaining suitable alignment of the parts, we recommend the use of a plurality of dummies or mandrels of a diameter corresponding to that of the workpieces to be heat-treated. The various items or parts of the scanner machine are adjusted until the dummies or mandrels easily slide horizontally through the scanner machine without jamming. It may be necessary to slide a part on the rail 32, and to insert shims between the base plate of a part and the bedplate 20 for proper alignment before the part is bolted to the bedplate. By observation and measurement, adjustments can be made until the dummies pass through the head 173 of the induction heating and quenching means 26 substantially concentric therewith as nearly as practicable, and readily pass through the headstock and tailstock. Thus, in a manner of setting up the scanner machine, a dummy workpiece was placed in the feed-in guide 13 so that it extended through the end tube 170. The guide 13 was raised or lowered by turning the jackscrew 46 of the feeder 24 until the dummy rested on and between the two work-rotating rollers 138 and 140 of the headstock 24. The rollers were spun by hand for a check to see that they rotated the dummy. The upper roller 142 was then lowered by turning screw 156 of the headstock until the upper roller 142 touched the dummy. Only a slight pressure by the roller 142 was required to insure a positive rotation. By spinning the lower rollers 138 and 140 a few times by hand while turning the nuts 162, one can readily adjust the set 164 of headstock rollers. With the dummy pushed into the head 173 of the heat-treatment means 26, it should be possible to see a concentric circular ring of light between the outside diameter of the dummy and the internal diameter of the coil 174. If the dummy is not centered in the coil 174, the heat-treatment unit 26 can be shifted, or the other parts readjusted.

While we have described our invention in a preferred form thereof, it is subject to changes and the principles thereof can be embodied in other forms.

We claim as our invention:

1. Heat-treating apparatus of a type described comprising, in combination, induction heating and quenching heat-treatment means having a central work-receiving opening; a headstock and a tailstock at opposite ends of said heat-treatment means and positioned closely adjacent but not in contact therewith, each comprising work-rotating rollers; a feed-in guide extending to said headstock and having a horizontal rail means providing a tunnel-like arrangement adapted to slidably hold workpieces axially end to end, said tunnel-like arrangement guide being horizontal; said heat-treatment means, headstock, tailstock and guide being arranged to provide a substantially horizontal travel path for workpieces; and a work feeder associated with said feed-in guide and comprising a roller means for forcing workpieces end to end along said feed-in guide.

2. Apparatus of a type described for heat-treating workpieces of rod-like shape, comprising in combination, induction heating and quenching heat-treatment means having a central work-receiving opening; a headstock and a tailstock positioned at opposite ends of said heat-treatment means with a spacing respectively therebetween which is but a fraction of the axial length of said heat treatment means, each comprising work-rotating rollers; a feed-in guide extending to said headstock and adapted to hold workpieces axially end to end, said feed-in guide comprising a tubular member with its opening directed to the feed-in end of said headstock; each of said rollers having an axis which is substantially parallel to said feed-in guide; and a work-supporting feed-out guide extending from the exit end of said tailstock, the last said guide comprising a tubular member with its opening directed to the said end of said tailstock.

3. An induction heating scanner machine comprising, in combination, an elongated substantially horizontal bedplate, a work feeder unit carried by said bedplate, said feeder unit comprising a lower guide comprising a bar member having a V-trough extending in a direction parallel to the lengthwise direction of said bedplate, said feeder unit comprising an upper pressure roller means for forcing workpieces end to end along said guide; a set of work-rotating rollers carried by said bedplate at the exit end of said guide, said rollers being arranged to receive workpieces horizontally from said guide, an induction heating and quenching means, the last said means comprising an induction coil having a horizontal axis collinear with the travel-path of workpieces passing through the last said rollers, said bedplate carrying a pair of relatively insulated terminals, conductor plates secured to said terminals and to ends of said coil, said plates carrying said coil, and a tailstock carried by said bedplate and comprising a set of work-rotating rollers positioned at the work-outlet end of said induction heating and quenching means and spaced therefrom a distance less than the combined axial length of said induction heating and quenching means, said set of rollers being arranged to receive workpieces leaving said induction heating and quenching means.

4. An induction heating scanner machine comprising a horizontal elongated bedplate, a feeder item carried by said bedplate, a distinct headstock means carried by said bedplate next to said feeder item, a horizontal feed-in guide carried by said feeder item, said headstock comprising a work-rotating means at the exit end of said guide, an induction heating and quenching means carried by said bedplate, said induction heating and quenching means comprising an induction coil and having a horizontal central opening arranged to receive workpieces from said headstock means, a distinct tailstock means carried by said bedplate arranged to receive work from said induction heating and quenching means, said tailstock means comprising work-rotating means and a horizontal feedout guide, said work-rotating means of said headstock means and tailstock means being close to but spaced from the ends of said induction heating and quenching means by respective distances less than the total axial length of said induction heating and quenching means.

5. An induction heating scanner machine comprising an elongated bedplate, a feeder item carried by said bedplate, said feeder item comprising work-pusher means, a distinct headstock means carried by said bedplate next to said feeder item, and comprising work-rotating means, a feed-in guide extending from the feed-in end of feeder unit to said work-rotating means, an induction heating and quenching means, said induction heating and quenching unit comprising an induction coil and having a central work-treating space arranged to receive workpieces from said work-rotating means, a distinct tailstock means carried by said bedplate arranged to receive work from said induction heating and quenching unit, said tailstock means comprising work-rotating and supporting means, a feed-out guide, said work-rotating means of said headstock means and tailstock means being close to but spaced from the ends of said induction heating and quenching unit by a distance less than the total axial length of the latter said unit, said bedplate carrying a pair of relatively insulated terminals between said headstock means and tailstock means, said induction heating coil having ends, conductor plates receiving said ends, said conductor plates being connected to said terminals and supporting said induction heating and quenching unit.

6. An induction heating scanner comprising work-supporting means comprising a guide member having a V-shaped trough and a tube at the end of said trough, said tube having an axis, a plurality of work-rotating rollers at the end of said tube, said work-rotating rollers being arranged to provide a work-receiving space having an axis, an induction heating coil having an axis, said axes being substantially parallel, each of said rollers having an axis which is substantially parallel to the axis of said heating coil and said rollers being axially spaced from said coil a distance less than the axial length of the coil.

WILLIAM L. CORTEGGIANO.
THEODORE P. KINN.

References Cited in the file of this patent

UNITED STATES PATENTS

| Number | Name | Date |
|---|---|---|
| 1,887,434 | Sammis | Nov. 8, 1932 |
| 1,992,812 | Chapman | Feb. 26, 1935 |
| 2,038,204 | Bidle | Apr. 21, 1936 |
| 2,048,557 | Mickelson et al. | July 21, 1936 |
| 2,325,638 | Strickland | Aug. 3, 1943 |
| 2,329,188 | Denneen et al. | Sept. 14, 1943 |
| 2,347,639 | Platt | Apr. 25, 1944 |
| 2,402,186 | Sherman | June 18, 1946 |
| 2,403,662 | Hurley | July 9, 1946 |
| 2,412,797 | Berliner | Dec. 17, 1946 |
| 2,417,678 | Cox | Mar. 18, 1947 |
| 2,465,397 | Marien et al. | Mar. 29, 1949 |
| 2,504,198 | Jagen | Apr. 18, 1950 |
| 2,574,564 | Hogel et al. | Nov. 13, 1951 |
| 2,591,339 | Davis | Apr. 1, 1952 |